United States Patent
Giraud et al.

(10) Patent No.: US 9,779,246 B2
(45) Date of Patent: Oct. 3, 2017

(54) SYSTEM AND METHOD FOR UPDATING AN OPERATING SYSTEM FOR A SMART CARD OR OTHER SECURE ELEMENT

(71) Applicant: OBERTHUR TECHNOLOGIES, Colombes (FR)

(72) Inventors: Christophe Giraud, Nanterre (FR); Olivier Chamley, Nanterre (FR); Gregoire Godel, Nanterre (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 66 days.

(21) Appl. No.: 13/946,681

(22) Filed: Jul. 19, 2013

(65) Prior Publication Data

US 2014/0025940 A1   Jan. 23, 2014

(30) Foreign Application Priority Data

Jul. 20, 2012 (FR) .................................... 12 57062

(51) Int. Cl.
*G06F 21/57* (2013.01)
*G06F 21/51* (2013.01)

(52) U.S. Cl.
CPC ............ *G06F 21/575* (2013.01); *G06F 21/51* (2013.01); *G06F 21/57* (2013.01)

(58) Field of Classification Search
CPC .......... G06F 9/4401; G06F 8/65; G06F 21/57; G06F 21/575
USPC ..................................................... 713/2, 100
See application file for complete search history.

(56) References Cited

U.S. PATENT DOCUMENTS

| | | | | |
|---|---|---|---|---|
| 5,987,605 A * | 11/1999 | Hill | ......................... | G06F 9/441 713/100 |
| 7,698,698 B2 * | 4/2010 | Skan | ............................. | 717/168 |
| 8,984,611 B2 * | 3/2015 | Jeannot | ............................. | 726/9 |
| 2006/0095753 A1 * | 5/2006 | Hori | ...................... | G06F 9/4408 713/1 |

(Continued)

FOREIGN PATENT DOCUMENTS

DE   199 26 389   12/2000
EP   2 330 507    6/2011

(Continued)

OTHER PUBLICATIONS

Ex, Bart Vinck, Preliminary Search Report dated Mar. 27, 2013 for French Appl No. 1257062 filed Jul. 20, 2012, pp. 1-2.

(Continued)

*Primary Examiner* — Chun Cao
(74) *Attorney, Agent, or Firm* — MH2 Technology Law Group, LLP (57) ABSTRACT

A secure element includes a boot program comprises instructions for the execution a startup step to determine if a non-volatile memory stores an active operating system, and, in the affirmative, to launch execution of the operating system, an authentication step of a updater device, as a function of first authentication data determined by a secure element and second authentication data received from the updater device, and, in response to the authentication step, a storage step of a new operating system received from the update, device in the non-volatile memory and an activation step of the new operating system, when said instructions are executed by a microprocessor.

13 Claims, 6 Drawing Sheets

(56) References Cited

U.S. PATENT DOCUMENTS

| | | | |
|---|---|---|---|
| 2006/0101454 A1* | 5/2006 | Whitehead | 717/168 |
| 2006/0130046 A1* | 6/2006 | O'Neill | 717/168 |
| 2007/0074048 A1* | 3/2007 | Rudelic et al. | 713/193 |
| 2007/0083744 A1* | 4/2007 | Seok | 713/1 |
| 2007/0220242 A1 | 9/2007 | Suzuki et al. | |
| 2009/0064123 A1 | 3/2009 | Ramesh et al. | |
| 2010/0058042 A1* | 3/2010 | Locker | G06F 9/4416 713/2 |
| 2010/0180108 A1* | 7/2010 | Liu | 713/2 |
| 2014/0351569 A1* | 11/2014 | Durand | 713/1 |

FOREIGN PATENT DOCUMENTS

| | | |
|---|---|---|
| EP | 2 453 352 | 5/2012 |
| JP | H11122238 A | 4/1999 |
| JP | 2008276555 A | 11/2008 |
| JP | 2010244358 A | 10/2010 |
| JP | 2012058803 A | 3/2012 |
| KR | 20080039046 A | 5/2008 |

OTHER PUBLICATIONS

Japanese Office Action mailed Mar. 28, 2017, Japanese Application No. 2013-150450, pp. 1-6 (including English Translation).

Yuuki Mochizuki, "Prototyping of the Encrypted Load-Module Capability and the Secure File Server for Embedded Operating Systems", Proceedings of FIT 2010 (the 9th Forum on Information Technology), Aug. 20, 2010, pp. 1-14 (including English Translation).

* cited by examiner

FIG.7

SYSTEM AND METHOD FOR UPDATING AN OPERATING SYSTEM FOR A SMART CARD OR OTHER SECURE ELEMENT

CROSS-REFERENCE TO RELATED APPLICATIONS

This application claims priority to French Patent Application 1257062 filed Jul. 20, 2012, the entire disclosure of which is hereby incorporated by reference in its entirety.

BACKGROUND OF THE INVENTION

The present invention relates to the field of onboard secure elements such as smart cards.

An onboard secure element, for example a smart card, typically has the material architecture of a computer and comprises especially a microprocessor and a non-volatile memory comprising computer programs executable by the microprocessor. In particular, the non-volatile memory comprises an operating system loaded by the manufacturer with the secure element before it is made available to a user.

It may be preferable to update the operating system after providing the user with the secure element.

Document WO 20121062632 A1 describes a software updating process in on onboard element. This process comprises the effacement of the software, the loading an updating management program in place of the software, which loads a priming program updated when the onboard element starts up. The security of this solution is based solely on the imprint of the software. This solution is therefore not appropriate for applications needing a high degree of security. Also, the process needs to restart the secure element twice.

There is therefore a need for a reliable and secure updating method for software of a secure element.

AIM AND SUMMARY OF THE INVENTION

The invention proposes a secure element comprising at least one microprocessor, a non-volatile memory and a communications interface, the secure element being capable of communicating with an updater device via the communications interface, the non-volatile memory storing at least one boot program, the microprocessor being configured to execute the boot program during startup of the secure element. This secure element is remarkable in that the boot program comprises instructions for the execution of:
 a startup step to determine if the non-volatile memory stores an active operating system, and, in the affirmative, to launch execution of the operating system,
 an authentication step of the updater device, as a function of first authentication data determined by the secure element and second authentication data received from the updater device,
 in response to the authentication step, a storage step of a new operating system received from the updater device in the non-volatile memory and an activation step of the new operating system, when said instructions are executed by the microprocessor.

The boot program therefore enables updating of the operating system, securely and reliably. In fact, as this updating needs authentication of the updater device, it is impossible for a third party to supply a corrupted version of the operating system to the secure element.

According to an embodiment, the authentication step of the updater device comprises:
 a step for sending a message containing a variable to the updater device,
 a step for receipt of second authentication data,
 a determination step of first authentication data as a function of said variable and a key stored in said non-volatile memory, and
 a comparison step of the first authentication data and the second authentication data.

In this way, the boot program itself comprises all the instructions necessary for completing authentication of the updater device. The updating of the operating system can therefore be initiated or continued when the non-volatile memory includes no operating system or when the operating system has been deactivated, for example during a previous updating attempt which ha snot succeeded.

The boot program can also comprise instructions for execution of a step for sending a message containing an encrypted datum as a function of the key and said variable to the updater device.

This allows the updater device to authenticate the secure element. Mutual authentication between the secure element and the updater device is therefore completed. In this way, only a secure authenticated element can obtain the new version of the operating system.

According to an embodiment, the non-volatile memory comprises an operating system including instructions for execution of:
 a step for sending a message containing the variable to the updater device.
 a step for receipt of the second authentication data,
 where necessary, a step for sending a message containing an encrypted datum as a function of the key and of the variable to the updater device.

In this case, if the non-volatile memory comprises an active operating system, the latter comprises the instructions letting it participate in the authentication, in collaboration with the boot program. The updating of the operating system can therefore be initiated during normal operation of the secure element, when its operation is managed by the operating system.

The storage step can comprise receipt of the new encrypted operating system.

In this way, a third party which intercepts communication between the updater device and the secure element cannot obtain the new version of the operating system.

In this case, the authentication step can comprise determination of a session key as a function of said key and said variable, and the storage step can comprise receipt of the new operating system encrypted with said session key.

As the same session key is used for encrypted authentication and communication, necessary cryptographic resources in the secure element are limited.

For security and reliability reasons, the boot program is preferably stored so that it cannot be modified.

For example, the boot program is stored in a non-rewritable part of the non-volatile memory.

As a variant, the boot program is stored in a rewritable part of the non-volatile memory, the non-volatile memory containing an operating system configured to block the writing commands on the boot program.

The invention also proposes a terminal comprising at least one microprocessor, a non-volatile memory and a secure element according to the invention, the non-volatile memory of the terminal comprising an updating management program and an application designed for using a service provided by the secure element, the updating management program of instructions for execution of:

a transmission step comprising the receipt of the new operating system of the updater device and the envoi of the new operating system received to the secure element, a deactivation step of said service during at least the transmission step, when said instructions are executed by the microprocessor of the terminal.

The invention also provides a system comprising at least one secure element according to the invention and an updater device storing the new version of the operating system.

BRIEF DESCRIPTION OF THE DIAGRAMS

Other characteristics and advantages of the present invention will emerge from the following description, in reference to the attached diagrams which illustrate an embodiment having no limiting character, in which.

DETAILED DESCRIPTION OF AN EMBODIMENT

Figure 1:
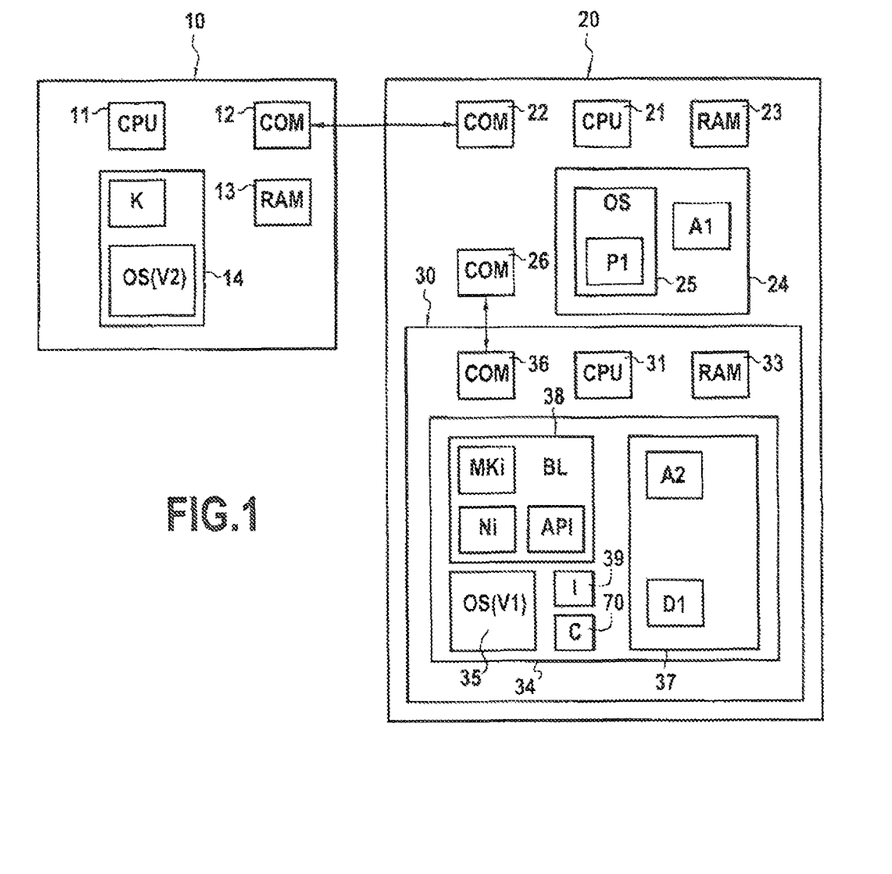
FIG. 1 illustrates a system including a secure element according to an embodiment of the invention.

FIG. 1 illustrates a system which comprises an updater device 10, a terminal 20 and a secure element 30 onboard in the terminal 20.

The updater device 10 has the material architecture of a computer and comprises especially a microprocessor 11, a communications interface 12, volatile memory 13 and non-volatile memory 14. The microprocessor 11 enables execution of computer programs stored in the non-volatile memory 14, by using the volatile memory 13 as a workspace. The communications interface 12 communicates with the terminal 20.

The non-volatile memory 14 especially stores a new version of an operating system for secure element, designated OS(V2), as well as a secret key K.

The updater device 10 is for example an updating server found or the premises of a manufacturer of secure elements. In this case, the communications interface 12 sets up communication with the terminal 20 by passing through a telecommunications network, for example via Internet. By way of a variant, the updater device 10 can itself be a secure element, for example an SD card, an NFC card or a USB memory. In this case, the communications interface 12 sets up communication with the terminal 20 by passing through a secure element reader.

The terminal 20 is for example a portable terminal belonging to a user, for example a portable telephone.

The terminal 20 has the material architecture of a computer and comprises especially a microprocessor 21, a communications interface 22, volatile memory 23, non-volatile memory 24 and a communications interface 26. The microprocessor 21 executes computer programs stored in the non volatile memory 24, by using the volatile memory 23 as workspace. The communications interface 22 communicates with the updater device 10. The communications interface 26 communicates with the secure element 30.

The non-volatile memory 24 especially stores the operating system 25 of the terminal 20, an updating management program P1, and data and applications of the user, an application A1 of which is illustrated.

The function of the program P1 is to manage communication between the secure element 30 and the updater device 10 for updating of the operating system of the secure element 30. The program P1 is preferably a module integrated into the operating system 25 of the terminal 20, as illustrated in FIG. 1.

The secure element 30 is for example a smart card housed removably in the terminal 20.

The secure element 30 has the material architecture of a computer and comprises especially a microprocessor 31, a communications interface 36, volatile memory 33 and non-volatile memory 34. The microprocessor 31 executes computer programs stored in the non-volatile memory 34 by using the volatile memory 33 as workspace. The communications interface 36 communicates with the terminal 20.

The non-volatile memory 34 especially stores a boot program 38 (designated BL for <<Boot Loader>>), an operating system 35, user data 37, an $MK_i$ key, a serial number $N_i$, a status indicator 39 of the operating system 35, and a variable 70 representing the value of an authentication counter C.

In the state illustrated the operating system 35 is a first version designated OS(V1) different to the version OS(V2) stored by the updater device 10.

The status indicator 39 of the operating system 35 can take an <<active>> or <<inactive>> value. It can be for example a status bit stored in the operating system 35 or else in the non-volatile memory 34. Its role is described hereinbelow.

The authentication counter C is initialised at a determined value, for example 50. During the updating process of the operating system, the counter C is decremented. On completion of the updating process, if the latter has succeeded, the counter is reinitialised. If the value of the counter C drops below a certain threshold, for example 3, this means that too many numerous updating attempts of the operating system 35 have failed. In this case, the updating process is blocked. It is no longer possible to update the operating system 35 by communicating with the updater device 10. However, it can be possible to reinitialise the secure element and to load a new operating system onto it by turning to a service provider having specific access rights.

The key $MK_i$ and the serial number $N_i$ correspond to the secret key K stored by the updater device 10, and are for example stored in the boot program 38. More precisely, the updater device 10 comprises derivation means for determining a key $MK_i$ corresponding to the serial number $N_i$ of a secure element i, according to a procedure kept secret. In a variant, not illustrated, the updater device 10 stores the keys $MK_i$ and the serial numbers $N_i$ of a plurality of secure elements. In both cases, the updater device 10 can determine the key $MK_i$ associated with a serial number $N_i$.

The user data 37 comprise especially applications, an application A2 of which is illustrated, and personal data whereof a set D1 is illustrated. The operating system 35 enables management of applications stored on the secure element 30. These applications are for example secure applications giving access to payment and transport services, and exploit a communications interface of the terminal 20 of NFC type.

The boot program 38 contains especially a programming interface API allowing interaction between the boot program 38 and the operating system 35 during their execution.

Communication between the terminal 20 and the secure element 30, via the communication interfaces 26 and 36 is for example based on the ADPU unit exchange in keeping with the standard ISO/IEC 7816-4.

The microprocessor 31 is configured to execute the boot program 38 during startup of the secure element 30. In normal operation, the boot program 38 launches execution of the operating system 35. The operating system 35 manages execution of applications and interpretation of commands received by the interface 36.

The boot program 38 is stored non-modifiably. For example, the boot program 38 is stored in a part of the non-volatile memory 34 of ROM type. In this case, the boot program 38 can be part of the initial boot program, used by the manufacturer of the secure element 30 to load the operating system 35 during commissioning of the secure element 30. By way of a variant, the boot program 38 is stored in a part of the rewritable non-volatile memory 24, for example of Flash memory type. In this case, the operating system 35 is configured to block any writing command in this part of the memory.

The operation of the system of FIG. 1 will now be described, in particular updating of the operating system 35 to replace the first version OS(V1) by the second version OS(V2).

Figure 2:
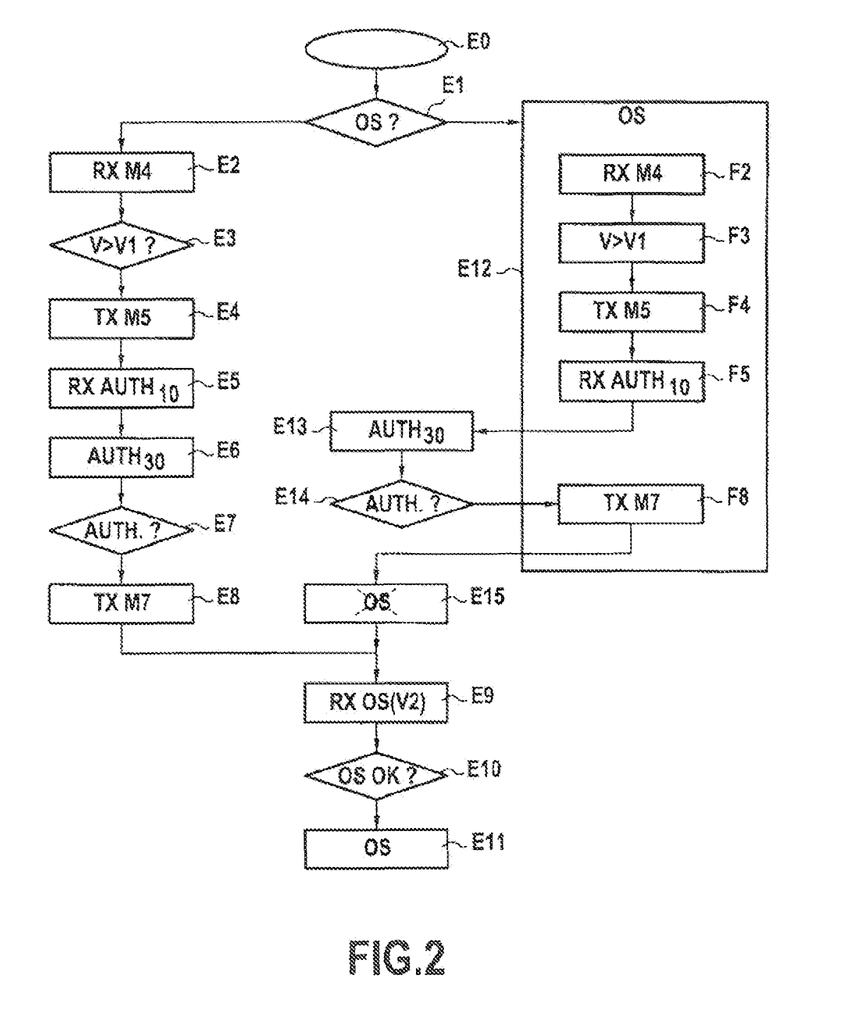
FIG. 2 illustrates the main steps corresponding to execution of the boot program of the secure element of FIG. 1.
Figure 3:
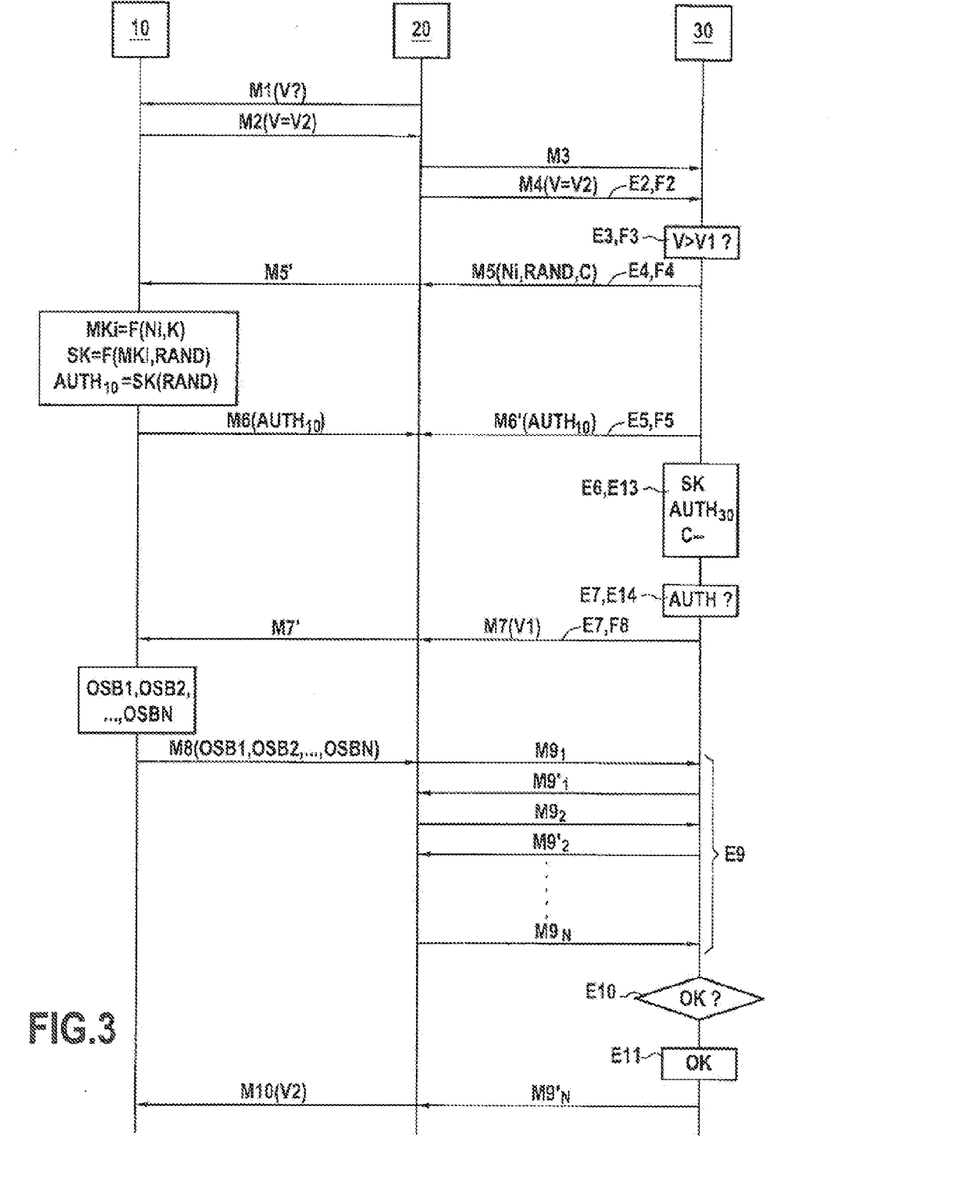
FIG. 3 illustrates the interactions in the system of FIG. 1 during updating of the operating system of the secure element.

FIG. 2 is a diagram of steps, which illustrates the main steps of an operating procedure of the secure element 30, corresponding to execution of the boot program 38. FIG. 3 is a diagram which illustrates the messages exchanged between the updater device 10, the terminal 20 and the secure element 30 during an operating procedure of FIG. 2.

This operating procedure starts at step E0 during startup of the secure element 30. As explained earlier, the microprocessor 31 is configured to launch execution of the boot program 38 during startup of the secure element 30. For example, the boot program 38 is at a predetermined placement of the non-volatile memory 34, called startup sector, to which the microprocessor 31 points initially.

Next, at step E1, the secure element 30 determines if the operating system 35 is active. More precisely, lithe non-volatile memory 34 contains the operating system 35 and the status indicator 39 shows the <<active>> value, it is considered that the operating system 35 is active. On the contrary, if the non-volatile memory 34 contains no operating system 35 or if the status indicator 39 shows the <<inactive>> value, it is considered that the operating system 35 is inactive.

If the operating system 35 is active, then at step E12 the boot program 38 launches execution of the operating system 35. This corresponds to the normal operation mode of the secure element 30, during which the operating system 35 administers the execution of applications and the commands received on the communications interface 36.

On the contrary, if the operating system 35 is inactive, the boot program 38 does not launch execution of the operating system 35. In other words, the boot program 38 retains control. The consequence of this especially is that the commands received on the communications interface 36 are managed by the boot program 38.

In this way, when the updating management program P1 of the terminal 20 sends messages M3 and M4 intended to launch the updating process of the operating system 35, these messages M3 and M4 are received either by the boot program 38 (step E2) if the operating system 35 is inactive, or by the operating system 35 (step F2) if it is active. The updating process of the operating system 35 is first described hereinbelow in the event where the operating system 35 is inactive (steps E2 to E11), then in the case where the operating system 35 is active (steps F2 to F5, E13, E14, F8, E15 and E9 to E11).

In reference to FIG. 3, the terminal 20 sends a message M1 to the updater device 10 to ask it for the latest available version of the operating system. Sending the message M1 forms part of the execution of the program P1 and is conducted for example periodically or when a predetermined condition is satisfied.

The updater device 10 responds to the message M1 by a message M2 which specifies the available version: V=V2.

Next, the terminal 20 sends a message M3 to the secure element 30 to select the updating application, that is, the part of the boot program 38 or of the operating system 35 responsible for execution of steps E2 and following or F2 and following. The message M3 is for example a command of ADPU type newly defined, called <<OS loader Application Selection>>.

Then, the terminal 20 sends a message M4 to the secure element 30 to inform it of the new version V2 available. The message M4 is received, at step E2, by the secure element 30. More precisely, in the present example where the operating system is inactive, the message M4 is managed directly by the boot program 38. The message M4 is for example a command of ADPU type newly defined, called <<PUSH AVAILABLE VERSION>>.

Next, at step E3, the secure element 30 determines the version of the operating system. For example, the boot program 38 interrogates the operating system 35 by using the API programming interface. If the operating system 35 is present, it responds by giving its version V. If no operating system is present, the hoot program 38 takes into account a version V by default which it stores, and which corresponds to the version of the operating system 35 initially loaded in the secure element 30 by the manufacturer. The secure element 30 verifies that the version V received in the message M4 is superior to the current version of the operating system 35, that is, V1 in this example.

If the version V received in the message M4 is superior to the current version of the operating system 35, then at step E4 the secure element 30 sends a message M5 to the updater device 10, by way of the terminal 20 which prolongs it by a message M5'. The message M5 contains the serial number $N_i$ of the secure element 30, a random number RAND and the value of the authentication counter C (variable 70).

As a function of the serial number Ni contained in the message M5', the updater device 10 determines the corresponding key $MK_i$, either as a function of the serial number $N_i$ and of the secret key K, according to the above derivation procedure, or by consulting the key $MK_i$ which it stores in correspondence with the received serial number $N_i$. Next, the updater device 10 determines a session key SK as a function of the determined key $MK_i$ and of the random number RAND received, and authentication data $AUTH_{10}$ by encryption of the random number RAND with the session key SK. The updater device 10 sends a message M6 containing the authentication data $AUTH_{10}$ to the secure element 30, by way of the terminal 20 which prolongs it in a message M6'. The message M6' is for example a command of ADPU type newly defined, called <<MUTUAL AUTHENTICATION>>.

The message M6' is received by the secure element 30 at step E5. In response to receipt of the message M6', the secure element 30 determines, at step E6, a session key SK, normally identical to the session key SK determined by the updater device 10, as a function of the master key $MK_i$ and the random number RAND, and the authentication data $AUTH_{30}$ by encryption of the random number RAND with the determined session key SK. The secure element 30 also decrements the authentication counter C.

Next, at step E7, the secure element 30 compares the authentication data $AUTH_{10}$ and $AUTH_{30}$. In case of correspondence, authentication, by the secure element 30, of the updater device 10 has been completed, with determination of a session key SK.

In case of authentication, at step E8 the secure element 30 sends a message M7 to the updater device 10, by way of the terminal 20 which prolongs it in a message M7'. The message M7 is encrypted with the session key SK and contains the current version V1 of the operating system 35 determined at step E3.

Receipt of the message M7' allows the updater device 10 to authenticate the secure element 30. For example, if the version is coded on two octets and the unencrypted message comprises 16 octets, the updater device 10 can authenticate the secure element by verifying that the 14 first octets of the unencrypted message M7' are zero. Mutual authentication between the secure element 30 and the updater device 10 has therefore been completed.

Next, the updater device 10 determines N blocks OSB1, OSB2, . . . OSBN. Each block comprises part of the operating system encrypted with the session key SK. The number N is selected so that the size of a block is sufficiently limited to be transmitted in a single command of ADPU type. The updater device 10 transmits the determined blocks to the terminal 20, in one or more messages M8. The terminal 20 stores the received blocks until all the blocks are received.

Next, the terminal 20 sends a succession of messages $M9_1$, $M9_2$, . . . $M9_N$ to the secure element 30, each message $M9_1$, $M9_2$, . . . $M9_N$ containing one of the blocks OSB1, OSB2, . . . OSBN. Each block is unencrypted by the secure element 30, by using the session key SK, and stored at the place of the version V1 of the operating system 35.

Each message $M9_j$, for j going from 1 to N−1 is for example a command of ADPU type newly defined, called <<LOAD BLOCK>> to which the secure element 30 responds via an acknowledgement message $M9_j'$. The message $M9_N$ is for example newly defined command of ADPU type, called <<LOAD LAST BLOCK>>. The receipt of messages $M9_1$, $M9_2$, . . . $M9_N$ by the secure element 30 constitutes a receiving step E9 of the new version of the operating system.

After receipt of the last message $M9_N$, at step E10, the secure element 30 completes verification of the new version of the operating system received, for example by a cyclic redundancy control test.

If the test is verified at step E11, the secure element 30 reinitialises the counter C, activates the operating system 35 and launches its execution. At this stage, the new version of the operating system 35 is therefore executed by the secure element 30.

In the case where, at step E1, it is determined that the operating system 35 is active, the operation is similar to that described earlier and the main differences will now be described. At step E12, the secure element 30 executes the operating system 35. In this way, as explained earlier, the message M4 received is managed by the operating system 35. The steps F2 to F5 of FIG. 2 correspond to steps E2 to E5 described earlier, but correspond to the execution of instructions of the operating system 35 and not of the boot program 38.

After receipt of authentication data $AUTH_{10}$, the operating system 35 queries the boot program 38, by way of the programming interface API, so that it verifies the authentication data $AUTH_{10}$ during steps E13 and E14 similar to steps E6 and E7. Next, it is the operating system 35 which responds via the message M7 at step F8. Then, the operating system 35 hands over to the boot program 38 at step E15.

At step E15, the boot program 38 deactivates the operating system 35. For example, the boot program clear the operating system 35 of the non-volatile memory 34, or modifies the value of the status indicator 39 to <<inactive>>. The following steps E9 to E11 are similar to those described earlier.

Steps E1 to E15 correspond to execution, by the microprocessor 31, of instructions of the boot program 38. Steps F2 to F5 and F8 correspond to execution, by the microprocessor 31, of instructions of the operating system 35.

Figure 4A:
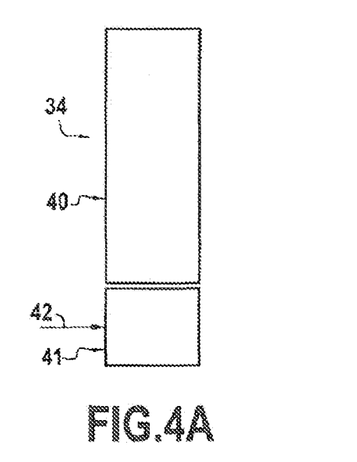
FIGS. 4A, 4B, 4C and 4D illustrates the state of the non-volatile memory of the secure element of FIG. 1, at different times.
Figure 4B:
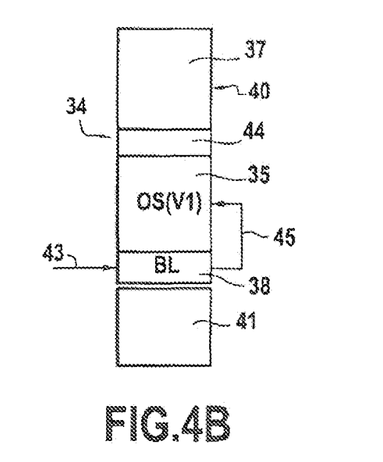

FIGS. 4A to 4D illustrate the content of the non-volatile memory 34 at different instants of the manufacturing process of the secure element 30 and of the updating of the operating system 35. FIGS. 4A and 4B show that, in this example, the non-volatile memory 34 comprises a rewritable part 40, for example of Flash memory type, and a non-rewritable part 41 of ROM type.

FIG. 4A illustrates the initial state of the non-volatile memory 34. The part 40 is empty and the part 41 comprises the initial boot program of the manufacturer of the card. In this initial state, the microprocessor 31 is configured to launch execution of this initial boot program during startup of the secure element 30, as illustrated by arrow 42. The function of the initial boot program is to enable loading of the boot program 38, the operating system 35 and the user data 37 into the part 40 of the non-volatile memory 34, during personalisation of the secure element 30 by the manufacturer.

FIG. 4B illustrates the state of the non-volatile memory 34 after personalisation of the secure element 30 by the manufacturer. The part 40 comprises the boot program 38, the operating system 35 (version OS(V1)), user data 37 and a non-utilised zone 44. The initial boot program of the part 41 has been deactivated and the microprocessor 31 is configured to launch execution of the boot program 38 during startup of the secure element 30, as illustrated by arrow 43. In this state, the operating system 35 is activated and the boot program 38 therefore launches execution of the operating system 35, as illustrated by arrow 45. This corresponds to steps E0, E1 and E12 described earlier.

Figure 4C:
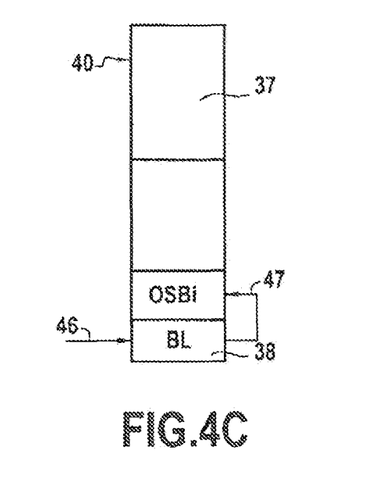

FIG. 4C illustrates the part 40 of the non-volatile memory 34 during the updating process of the operating system 35. More precisely, in the state of FIG. 4C, the operating system 35 has been deactivated (step E15 of FIG. 2), either by deletion or by modification of the status indicator 39. The boot program 38 receives messages $M9_i$, illustrated by arrow 46, and stores the blocks OSBi contained in these messages at the place of the former version of the operating system 35, as illustrated by arrow 47. This corresponds to step E9 of FIG. 2.

Figure 4D:
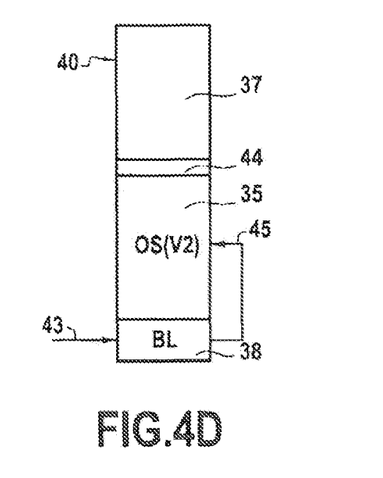

FIG. 4D illustrates the part 40 of the non-volatile memory 34 after the updating of the operating system 35 (step E11 of FIG. 2). The part 40 comprises the boot program 38, the operating system 35 in the version OS(V2), the user data 37 and a non-utilised zone 44. As versions OS(V1) and OS(V2) of the operating system 35 do not necessarily have the same size, the non-utilised zone 44 can be a different size between FIG. 4D and FIG. 4B. In the illustrated state, the operating system 35 is activated. The microprocessor 31 is configured to launch execution of the boot program 38 during startup of the secure element, as illustrated by arrow 43. In this state, the operating system 35 is activated and the boot program 38 therefore launches the execution of the operating system 35, as illustrated by arrow 45.

FIGS. 5A to 5D illustrate an example of the processing of messages M4 (command ADPU<<PUSH AVAILABLE VERSION>>) and M6' (command ADPU<<MUTUAL AUTHENTICATION>>) by the secure element 30.

Figure 5A:
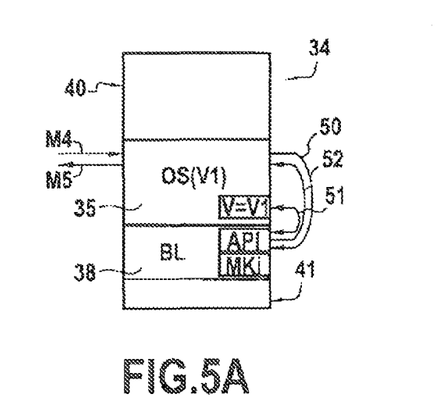
FIGS. 5A, 5B, 5C and 5D illustrates the non-volatile memory of the secure element of FIG. 1 to illustrate the processing of commands.

In particular, FIG. 5A illustrates the processing of a message M4 (command ADPU<<PUSH AVAILABLE VERSION>>) when the operating system 35 is active. The receipt of the message M4 therefore corresponds to step F2 of FIG. 2. In response to message M4, the operating system 35 queries the boot program 38 to determine the version of the operating system 35 (arrow 50). The boot program 38 then consults the version information in the operating system 35 (arrow 51) and responds to the operating system (arrow 52). These exchanges are made by the programming interface API. Next, the operating system 35 responds via a message M5, which corresponds to step F4 of FIG. 2.

Figure 5B:
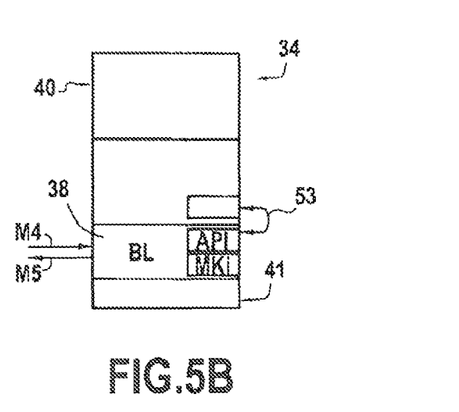

By way of comparison, FIG. 5B illustrates the processing of a message M4 (command ADPU<<PUSH AVAILABLE VERSION>>) when the operating system 35 is inactive. In this example, the operating system 35 has been cleared. The receipt of the message M4 corresponds to step E2 of FIG. 2. In response to message M4, the boot program 38 attempts to query the operating system 35 to determine the version of the operating system 35 (arrow 53). As the operating system 35 has been cleared, the boot program 38 receives no response and therefore uses the default version which it stores. Next, the boot program 38 responds via a message M5, which corresponds to step E4 of FIG. 2.

Figure 5C:
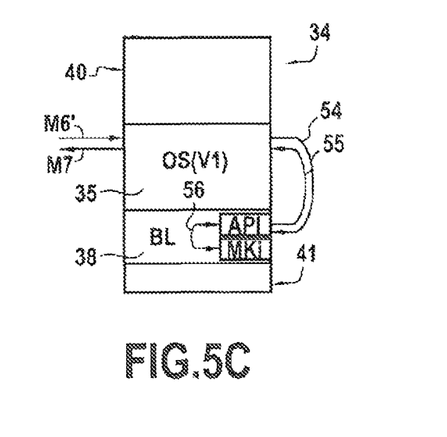

FIG. 5C illustrates the processing of a message M6' (command ADPU<<MUTUAL AUTHENTICATION>>) when the operating system 35 is active. The receipt of the message M6' therefore corresponds to step F5 of FIG. 2. In response to the message M6', the operating system 35 queries the boot program 38 to verify the authentication data $AUTH_{10}$ of the updater device 10 (arrow 54). The boot program 38 verifies the authentication data $AUTH_{10}$ by using the master key $MK_i$ (arrow 56). This corresponds to steps E13 and E14 of FIG. 2. The boot program 38 confirms authentication to the operating system (arrow 55). Next, the operating system 35 responds via a message M7, which corresponds to step F8 of FIG. 2.

Figure 5D:
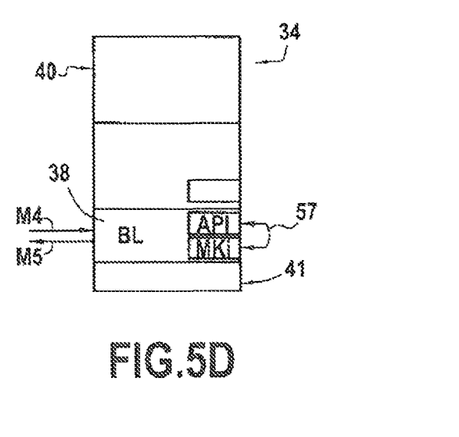

By way of comparison, FIG. 5D illustrates the processing of a message M6' (command ADPU<<MUTUAL AUTHENTICATION>>) when the operating system 35 is inactive. The receipt of the message M6' therefore corresponds to step E5 of FIG. 2. In response to the message M6', the boot program 38 verifies the authentication data $AUTH_{10}$ by using the master key $MK_i$ (arrow 57). This corresponds to steps E6 and E7 of FIG. 2. The boot program 38 confirms authentication and responds via a message M7, which corresponds to step E8 of FIG. 2.

In reference to FIGS. 2 and 3, the realisation of mutual authentication and encrypted communication between the secure element 30 and the updater device 10 is described. The expert is capable of selecting formats for keys and cryptographic algorithms appropriate for carrying out these functions. A non-limiting example of this is given herein below.

The updater device 10 stores a secret key K of 32 octets. When it receives a serial number $N_i$ of 16 octets, the updater device 10 can determine the key $MK_i$ of 32 octets corresponding to the secure element 30 whereof the serial number is $N_i$, as a function of K and $N_i$. The algorithm for calculating $MK_i$ as a function of K and $N_i$ can be selected by the designers of the system and kept secret to improve security. The use of the serial number $N_i$ differentiates the authentication data and the encrypting for different secure elements. The secure element stores the key $MK_i$ directly and therefore does not have to calculate $MK_i$ as a function of K and $N_i$.

The session key SK can be determined by using the algorithm AES-256, as a function of the key $MK_i$ and of the random number RAND of 32 octets. The updater device 10 and the secure element 30 calculate both: SK=AES-256 ($MK_i$, RAND).

In place of the random number RAND, another variable (pseudo-random variable, date, incremental number . . . ) can be used.

The authentication data $AUTH_{10}$ and $AUTH_{30}$ can also be determined by using the algorithm AES-256, as a function of the session key SK and of the random number RAND. In this way, the updater device 10 calculates $AUTH_{10}$=AES-256 (SK, RAND). Correspondingly, the secure element 30 calculates $AUTH_{30}$=AES-256(SK, RAND). By comparing the authentication data $AUTH_{10}$ received and the determined authentication data $AUTH_{30}$, the secure element 30 completes authentication of the updater device 10.

The message M7 sent by the secure element 30 to the updater device 10 comprises the current version V1 of the operating system 35 encrypted by the session key SK by using the algorithm AES-256-CBC-ISO9797-M1:M7=AES-256-CBC-ISO9797-M1 (SK, V1). This allows authentication of the secure element 30 by the updater device 10. To this effect, the mode CBC (<<Cipher-block chaining>>) is used and an ICV cryptogram is used which is determined as a function of the random number RAND. For example, ICV is determined by applying the algorithm AES-256 to 16 central octets of the random number RAND.

Figure 6:
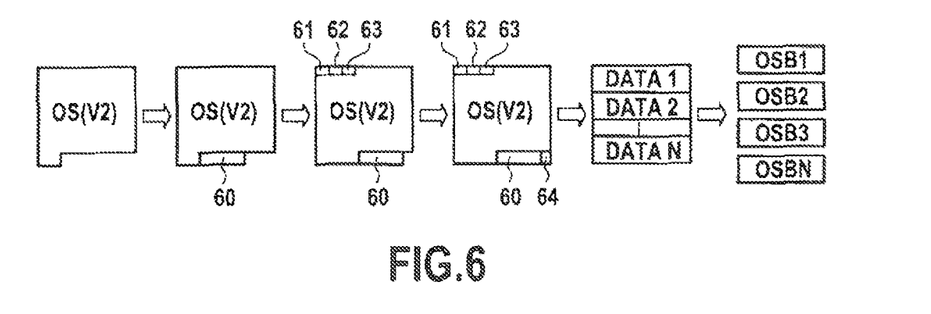
FIGS. 6 and 7 illustrate an example for determining blocks containing a new encrypted version of an operating system.
Figure 7:
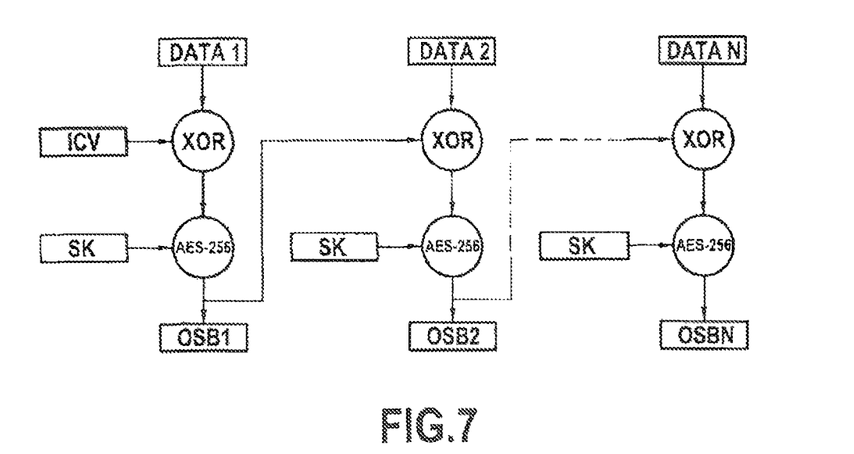

In this way, mutual authentication between the secure element 30 and the updater device 10 can be completed, FIGS. 6 and 7 illustrate an example of determination by the updater device 10 of blocks OSB1, OSB2, . . . OSBN which contain, encrypted, the new version OS(V2) of the operating system 35.

The code of the operating system, designated OS(V2), is a set of non-encrypted data especially containing instructions executable by the microprocessor 31. The updater device 10 adds an imprint 60 at the end of the code OS(V2). The imprint 60 is for example determined by using the algorithm SHA-512.

Next, the updater device 10 adds to the beginning of the code OS(V2) a secret number 61, the size 62 of the code OS(V2) and the version 63 of the operating system of the code OS(V2). The secret number 61 is for example coded on four octets and is known to the updater device 10 and the secure element 30. It offers added security during verification, via the secure element 30, of the received operating system. The size 61 is for example coded on four octets. The version 63 of the operating system of the code OS(V2) is for example coded on two octets.

Next, the updater device 10 adds to the end of the set formed by the secret number 61, the size 62, the version 63, the code OS(V2) and the imprint 61, filling data 64 (for example octets of values <<0>>) to achieve a total number of octets which is a multiple N of 16. It is therefore possible to decompose all the data formed in N blocks Data1, Data2, . . . DataN of 16 octets, which con Lain the code OS(V2) non-encrypted.

From blocks Data1, Data2, . . . DataN, the updater device 10 determines the blocks OSB1, OSB2, . . . OSBN which contain the encrypted code OS(V2), for example as illustrated in FIG. 7.

In FIG. 7 ICV is a cryptogram determined as a function of the random number RAND. For example, ICV is determined by applying the algorithm AES-256 to 16 central octets of the random number RAND.

Next, the encryption of blocks Data1, Data2, . . . , DataN is carried out by the algorithm AES-256 in CBC («Cipherblock chaining») mode by using the key SK and the ICV cryptogram. In this way, the ICV cryptogram and the block Data1 are combined by an XOR operation (OU exclusive). Next, the result of this operation XOR is encrypted by using the session key SK and the algorithm AES-256 to determine the block OSB1.

For each following block Data(i), the corresponding block OSB(i) is determined similarly, but by using the block OSB(i−1) in place of the ICV cryptogram.

After having received each block OSB(i), at step E9 of FIG. 2, the secure element 30 can decrypt the data received with the session key SK. Next, at step E10, verification especially of the imprint 60 and of the secret number 61 detects any corruption.

The system of FIG. 1 has several advantages.

In particular, it is possible to update the operating system 35 of the secure element 30. This updating can be done while the secure element 30 is already as an operation in the terminal 20 of a user. In the case of communication between the terminal 20 and the updater device 10 passing through a telecommunications network, the user must not go to a determined site such as the shop of a service provider. The operating system 35 can be replaced in its entirety. During updating, the user data 37 are not modified. In this way, after updating, the user still has his applications and his personal data. Also, operation of the terminal 20 must not be interrupted.

Because of mutual authentication of the updater device 10 and the secure element 30, and encrypted communication between the updater device 10 and the secure element 30, it is not possible for a third party to obtain the new version OS(V2) of the operating system or to provide a corrupted version to the secure element 30 by passing itself off as the updater device 10. In particular, if the program P1 of the terminal 20 is replaced by a corrupted version, this version can at best obtain the encrypted blocks OSB(i). In other words, the confidentiality: and integrity of the operating system are protected. These characteristics can attain certification of the secure element and/or of the system.

The updater device 10 can count the attempts of mutual authentication which have failed. If this number reaches a determined threshold, the updater device 10 can take a protective step, for example send a warning or blacklist the secure element.

As mutual authentication and encrypting are based on a serial number of the secure element, they are diversified via secure element. One fault therefore does not affect all the secure elements linked to the updater device.

The random number RAND is generated by the secure element, and not by the updater device 10. This limits the workload imposed on the au updater device, which is particularly interesting in the case of an updater device in relation to numerous secure elements.

The use of the same session key SK for mutual authentication and encrypted communication between the secure element and the updater device limits necessary resources at the level of the secure element. But, in a variant embodiment mutual authentication and encrypted communication use different keys.

The presence of the program P1 on the terminal 20 adapts the performance of the terminal 20 during updating of the operating system. For example, the applications of the terminal 20 which employ applications of the secure element 30 can be deactivated during updating.

The invention claimed is:

1. A secure element comprising:
   at least one microprocessor;
   a non-volatile memory; and
   a communications interface;
   the secure element being capable of communicating with an updater device for updating an operating system of the secure element via the communications interface,
   the non-volatile memory storing at least one boot program,
   the at least one microprocessor being configured to execute the at least one boot program during startup of the secure element,
   wherein the at least one boot program comprises instructions for execution of:
      a startup step to determine a status of an operating system stored in the non-volatile memory, wherein the secure element selects the at least one boot program as an updating application based on a determination that a status indicator of the operating system shows an inactive value,
      an authentication step that authenticates the updater device as a function of first authentication data determined by the secure element and second authentication data received from the updater device, and
      in response to the authentication step, a storage step that stores a new operating system received from the updater device in the non-volatile memory and an activation step that activates the new operating system, when said instructions are executed by the at least one microprocessor,
   wherein the secure element selects the operating system as an updating application based on a determination that the status of the operating system is active.

2. The secure element as claimed in claim 1, wherein, the authentication step comprises:
   a step for sending a message containing a variable to the updater device;
   a step for receiving the second authentication data;
   a determination step of the first authentication data as a function of said variable and a key stored in said non-volatile memory; and
   a comparison step that compares the first authentication data and second authentication data.

3. The secure element as claimed in claim 2, wherein the at least one boot program comprises instructions for execution of a sending step of a message containing an encrypted datum as a function of the key and said variable to the updater device.

4. The secure element as claimed in claim 1, wherein the at least one boot program comprises instructions for execution of a second startup step to determine a second status of the operating system stored in the non-volatile memory, wherein based on a determination that the status indicator of the operating system shows an active value, the operating system includes instructions for execution of:
   a sending step of a message containing a variable to the updater device; and
   a receiving step of the second authentication data.

5. The secure element as claimed in claim 4, wherein the operating system includes instructions for execution of a sending step of a message containing an encrypted datum as a function of a key and of said variable to the updater device.

6. The secure element as claimed in claim 1, wherein the storage step comprises receipt of the new operating system encrypted.

7. The secure element as claimed in claim 1, wherein the authentication step comprises determination of a session key as a function of a key and a variable, and the storage step comprises receipt of the new operating system encrypted with said session key.

8. The secure element as claimed in claim 1, wherein the at least one boot program is stored in a non-rewritable part of the non-volatile memory.

9. The secure element as claimed in claim 1, wherein the at least one boot program is stored in a rewritable part of the non-volatile memory, the non-volatile memory containing an operating system configured to block writing commands on the at least one boot program.

10. A terminal comprising:
   at least one microprocessor;
   a non-volatile memory; and
   a secure element as claimed in claim 1;
   the non-volatile memory of the terminal comprising an updating management program and an application for using a service provided by the secure element, the updating management program comprising instructions for execution of:
      a transmission step comprising receipt of the new operating system from the updater device and sending the new received operating system to the secure element, and
      a deactivation step of said service during at least the transmission step, when said instructions are executed by the at least one microprocessor of the terminal.

11. A system comprising:
   at least one secure element comprising:
      at least one microprocessor;
      a non-volatile memory that stores at least one boot program; and
      a communications interface;
      wherein the at least one secure element communicates with an updater device for updating an operating system of the secure element via the communications interface;
      wherein the at least one microprocessor executes the at least one boot program during startup of the at least one secure element; and
      wherein the at least one boot program comprises instructions for execution of operations comprising:
         determining a status of an operating system stored in the non-volatile memory, wherein the secure element selects the at least one boot program as an updating application based on a determination that a status indicator of the operating system shows an inactive value;
         authenticating the updater device as a function of first authentication data determined by the at least one secure element and second authentication data received from the updater device;
         in response to the authenticating, storing a new operating system received from the updater device in the non-volatile memory; and
         activating the new operating system;
      wherein the secure element selects the operating system as an updating application based on a determination that the status of the operating system is active; and
      the updater device that stores the new operating system.

12. The secure element as claimed in claim 1, wherein the at least one boot program comprises instructions for execution of a determination step to determine a version of the operating system, and wherein the authentication step is based on a determination that an indication of an available version of the operating system received from the updater device is superior to the version of the operating system.

13. The secure element as claimed in claim 11, wherein the at least one boot program comprises instructions for execution of operations comprising determining a version of the operating system, and wherein authenticating the updater device is based on a determination that an indication of an available version of the operating system received from the updater device is superior to the version of the operating system.

* * * * *